(12) United States Patent
Kim et al.

(10) Patent No.: US 6,209,131 B1
(45) Date of Patent: Mar. 27, 2001

(54) APPARATUS AND METHOD FOR PROCESSING ADDITIONAL INFORMATION IN DISPLAY DEVICE

(75) Inventors: Jae Ryong Kim; Sang Won Chung, both of Kyonggi-do; Se Jung Sohn, Seoul; Mun Youl Lee, Seoul; Sung A Cho, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/434,467

(22) Filed: Nov. 5, 1999

(30) Foreign Application Priority Data

Dec. 1, 1998 (KR) .................................................. 98-52258

(51) Int. Cl.[7] .............................. G06F 3/00; G06F 13/00
(52) U.S. Cl. ................................................. 725/50; 725/58
(58) Field of Search .............................. 348/906; 345/327

(56) References Cited

U.S. PATENT DOCUMENTS 5,652,613 * 7/1997 Lazarus et al. ........................... 348/7
5,841,433 * 11/1998 Chaney ................................. 345/327
5,917,481 * 6/1999 Rzeszewski et al. ................. 345/327

* cited by examiner

*Primary Examiner*—Andrew Faile
*Assistant Examiner*—Ngoc Vu

(57) ABSTRACT

An apparatus and method for processing additional information in a display device. It is detected whether additional information newly received from a broadcasting station is different from previously received additional information. If the newly and previously received additional information are different from each other, it is also detected whether the newly received additional information is a substitute for the previously received additional information. If the newly received additional information is the substitute for the previously received additional information, previous redundant additional information stored in a memory is updated to the newly received additional information. Then, a visual indication of the updated additional information is provided to a viewer. When a scheduled program has been changed, such a situation is automatically detected and notified to the viewer. Therefore, the viewer can be prevented from becoming confused and also reserving an undesired program. In particular, information on a program after change is displayed in the form of a graphic symbol such as an icon, so that the viewer can visually readily recognize the program change situation without viewing detailed information.

21 Claims, 5 Drawing Sheets

FIG.1
Related art

| | | 11:30 | | 12:00PM | | 12:30 | | 1:00PM |
|---|---|---|---|---|---|---|---|---|
| 13 | CH.1 | 1 | program1-1 | 1 | program1-2 | 3 | program1-3 | |
| 14 | CH.2 | 1 | program2-1 | 1 | program2-2 | 3 | program2-3 | |
| 16 | CH.3 | 1 | program3-1 | 1 | program3-2 | 3 | program3-3 | |
| 19 | CH.4 | 1 | program4-1 | | | | 2 | program4-2 |
| 20 | CH.5 | 1 | program5-1 | 2 | program5-2 | 3 | program5-3 | |
| 22 | CH.6 | 1 | program6-1 | | | | | |
| 25 | CH.7 | 1 | program7-1 | 2 | program7-2 | 3 | program7-3 | |

| 1 | MODE | 2 | NAV | 3 | INFO | 4 | HELP | ns
APPARATUS AND METHOD FOR PROCESSING ADDITIONAL INFORMATION IN DISPLAY DEVICE

BACKGROUND OF THE INVENTION

1. Field of the Invention

The present invention relates in general to an apparatus and method for displaying program guide information in a display device, and more particularly to an apparatus and method for processing additional information in a display device, which are capable of when a scheduled program has been changed, automatically detecting such a situation and notifying a viewer of the change.

2. Description of the Prior Art

Television (TV) broadcasting stations transmit program guide information as well as programs. The program guide information is called electronic program guide (EPG) information, which is additional information for allowing a viewer to view a TV more conveniently. Namely, using the EPG information, the viewer can obtain information regarding current and future broadcast programs directly on a screen of the TV, with no need for a newspaper or other guide media.

The EPG information includes information about programs by channels and times and detailed information about broadcast programs served on channels, such as a broadcast time, program description, rating, pay-per-view condition and copy protection condition. In particular, each broadcasting station basically transmits information regarding a start time and play time of each program id further a program identifier (ID) of each program at the same time.

Accordingly, a display device such as a TV or set-top box is able to receive the above program guide information and provide detailed information regarding programs to the viewer.

FIG. 1 shows an example of a conventional EPG information displayed on a screen in a full grid mode, wherein channel names and program names are displayed in grids, respectively. In this drawing, a vertical axis represents channels and a horizontal axis represents time, typically, in a 30-minute unit. The program names are shown in the corresponding grids, which are arranged in the time axis to the channels. Each of the grids has a width corresponding to a broadcast time of the associated program.

On the other hand, a scheduled program may be canceled or postponed for various unexpected reasons. However, when the scheduled program is actually canceled or postponed, the associated broadcasting station does not transmit program information containing such a situation. The broadcasting station transmits only information regarding a program substituted for the scheduled program. As a result, the following problems are caused.

Firstly, because an EPG information containing only information about programs by channels and times, transmitted from broadcasting stations, is displayed on the screen, the viewer cannot recognize that a scheduled program has been changed. As a result, the viewer becomes confused when information about certain program other than the scheduled program suddenly appears on the EPG information.

Secondly, in the case where the broadcast schedule for a specific program is changed under the condition that it is reserved for recording on the EPG information, a quite unexpected program is recorded.

Thirdly, when a reminder function has been selected, the viewer gets confused with the fact that the broadcast schedule for a reserved program is changed without any prior notice.

SUMMARY OF THE INVENTION

Therefore, the present invention has been made in view of the above problems, and it is an object of the present invention to provide an apparatus and method for processing additional information in a display device, which are capable of, when a scheduled program has been changed, automatically detecting such a change and providing both program information before change and program information after change to a viewer.

In accordance with one aspect of the present invention, the above and other objects can be accomplished by providing an additional information processing apparatus comprising information extraction means for decoding a received broadcast signal to extract program guide information therefrom; first storage means for storing the extracted program guide information in a database form; second storage means including a channel storage area for storing the program guide information by channels, a cancel time storage area for managing play times of previous changed programs, and a change information storage area consisting of a cancel item for storing information on previous redundant programs and a substitute item for storing information on new programs to be substituted for the previous changed programs; and control means for reading the program guide information from the first storage means to detect whether a certain program among the program guide information is a substituted program and controlling data storage into the second storage means in accordance with the detection result.

Preferably, the channel storage area may store information associated with each program and information on the entire play time of programs scheduled on each channel.

In accordance with another aspect of the present invention, in a display device which has a memory for storing various additional information received from a broadcasting station, there is provided a method for processing the additional information, comprising the steps of a) comparing additional information newly received from the broadcasting station with previously received additional information to determine whether they are different from each other; b) detecting whether the newly received additional information is a substitute for the previously received additional information, if the newly and previously received additional information are different from each other; c) updating previous redundant additional information stored in the memory to the newly received additional information if the newly received additional information is the substitute for the previously received additional information; and d) providing a visual indication of the additional information updated at the step c) to a viewer.

Preferably, the additional information may be program guide information.

The above step a) may include the step of comparing the newly received additional information with the previously received additional information on the basis of an additional information list stored in the memory.

The above step b) may include the steps of b-1) detecting whether the newly received additional information is present in an additional information list stored in the memory and then detecting whether a play time of an input program associated with the newly received additional information is within the range of a channel play time, if the newly received additional information is not present in the additional information list; and b-2) retrieving a previous redundant program having a time redundancy with the play time of the input program from the additional information list, if the play time of the input program is within the range of the channel play time.

The above step c) may include the steps of c-1) deleting the previous redundant program information from the additional information list; c-2) adding the deleted previous redundant program information to a cancel item of a change list stored in the memory; c-3) adding information regarding a play time of the previous redundant program to a cancel time list stored in the memory; c-4) adding information regarding the input program to a substitute item of the change list; c-5) deleting information regarding the play time of the input program from the cancel time list; and c-6) adding the input program information to the additional information list.

The above step b) may further include the step of b-3) detecting whether the information regarding the play time of the input program is present in the cancel time list, if the play time of the input program is not within the range of the channel play time.

The above step c) may further include the steps of c-7) adding the input program information to the substitute item of the change list if the information regarding the play time of the input program is present in the cancel time list; c-8) deleting the information regarding the play time of the input program from the cancel time list; and c-9) adding the input program information to the additional information list.

The above step c) may further include the step of c-7) adding the input program information to the additional information list if the information on the play time of the input program is not present in the cancel time list and then updating information regarding the channel play time.

The above step d) may include the step of displaying the additional information updated at an additional information display mode on the basis of an additional information list and change list stored in the memory.

The above step d) may further include the step of displaying a graphic symbol to indicate the additional information updated at the additional information display mode.

The above step d) may further include the step of displaying both additional information before change and additional information after change on the basis of a cancel item and substitute item of a change list stored in the memory if detailed information of the additional information updated at the step c) is selected at the additional information display mode.

The above step d) may further include the step of displaying both additional information before change and additional information after change on a portion of a screen on the basis of a cancel item and substitute item of a change list stored in the memory if the additional information is changed while the viewer views a television.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing an example of a conventional EPG presentation displayed on a screen in a full grid mode;

DETAILED DESCRIPTION OF THE PREFERRED EMBODIMENTS

Figure 2:
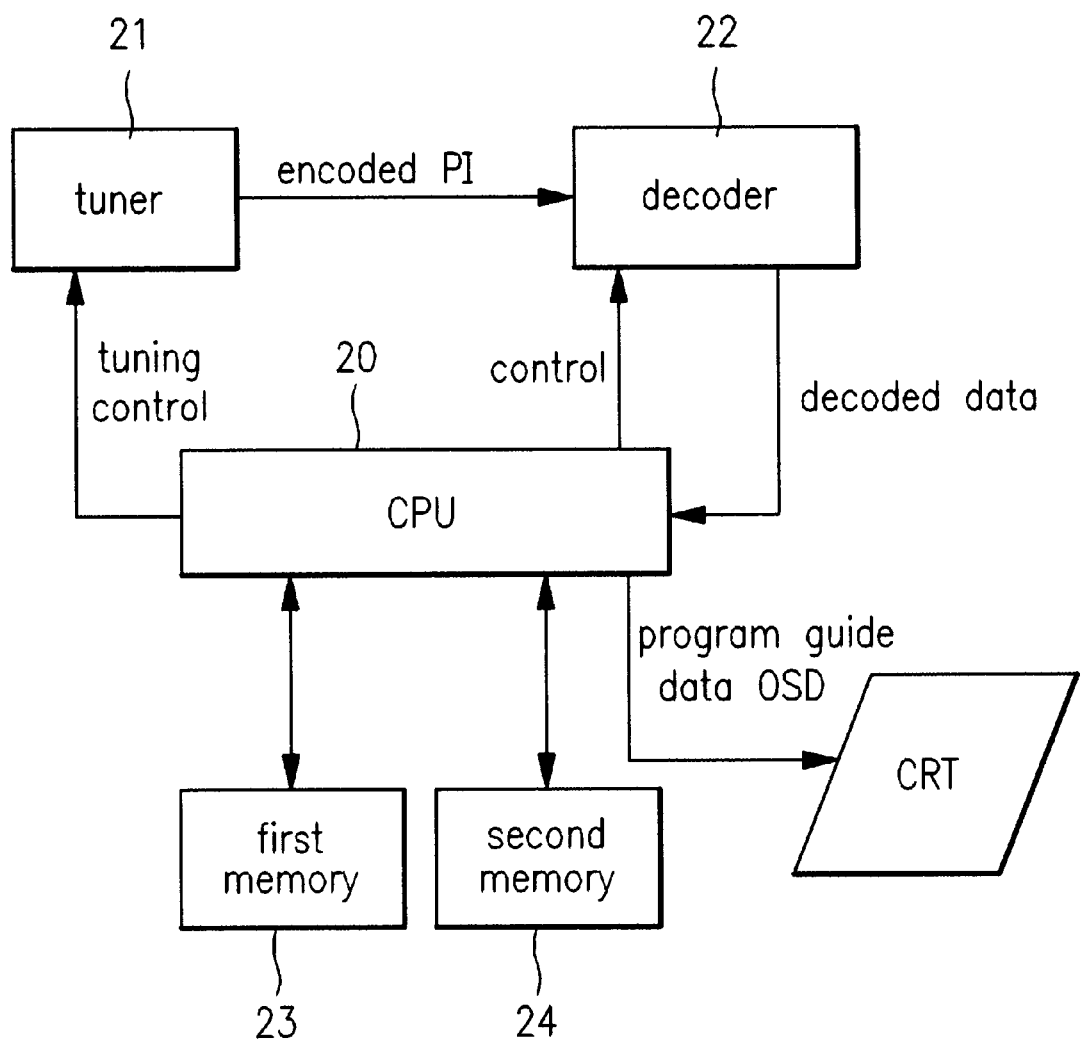
FIG. 2 is a block diagram of an apparatus for processing additional information in a display device in accordance with the present invention.

With reference to FIG. 2, there is shown in block form the construction of an apparatus for processing additional information in a display device in accordance with the present invention. As shown in this drawing, the additional information processing apparatus comprises a tuner 21 for tuning to a frequency of a desired channel to receive a broadcast signal on the desired channel through an antenna or cable, a decoder 22 for decoding the channel frequency tuned by the tuner 21 and separating audio and video (A/V) signals and program guide information from the decoded signal, a central processing unit (CPU) 20 for controlling the display of the program guide information separated by the decoder 22, a first memory 23 for storing in the program guide information separated by the decoder 22, and a second memory 24 for storing data processed as a format which can be used on an EPG.

Now, a detailed description will be given of the operation of the additional information processing apparatus with the above-mentioned construction in accordance with the present invention.

First, the tuner 21 tunes to a frequency of a channel desired by a viewer to receive a broadcast signal on the desired channel through the antenna or cable. The decoder 22 decodes the channel frequency tuned by the tuner 21 and separates A/V signals and program guide information from the decoded signal. Namely, because the decoded A/V signals and program guide information were multiplexed into a transport packet form, they are separated by a demultiplexing operation of the decoder 22. The separated A/V signals from the decoder 22 are outputted to a cathode ray tube (CRT) under the control of the CPU 20. The separated program guide information from the decoder 22 is temporarily stored in the first memory 23 under the control of the CPU 20 and then again stored in the second memory 24 in the following manner.

That is, the program guide information, decoded by the decoder 22 and stored in the first memory 23, is stored as a channel list in the second memory 24 and it is managed channel under the control of the CPU 20.

The channel list of the second memory 24 includes program associated data such as a program ID, program name, channel name, program play time, and channel play time data made of the play time of programs scheduled on each channel. Here, the channel play time data means a start time of the earliest program and an end time of the latest program, among programs of each channel displayed on the EPG, and the program play time data means a start time and end time of each program.

The second memory 24 further stores a cancel time list and change list. The cancel time list is provided for management of play times of changed programs, and the change list is provided for management of programs before and after change. The change list is composed of a cancel item and substitute item. The cancel item includes data regarding previous redundant programs (for example, program names, program play times, etc), and the substitute item includes data regarding new programs to be substituted for the previous changed programs (for example, program names, program play times, etc).

Figure 3:
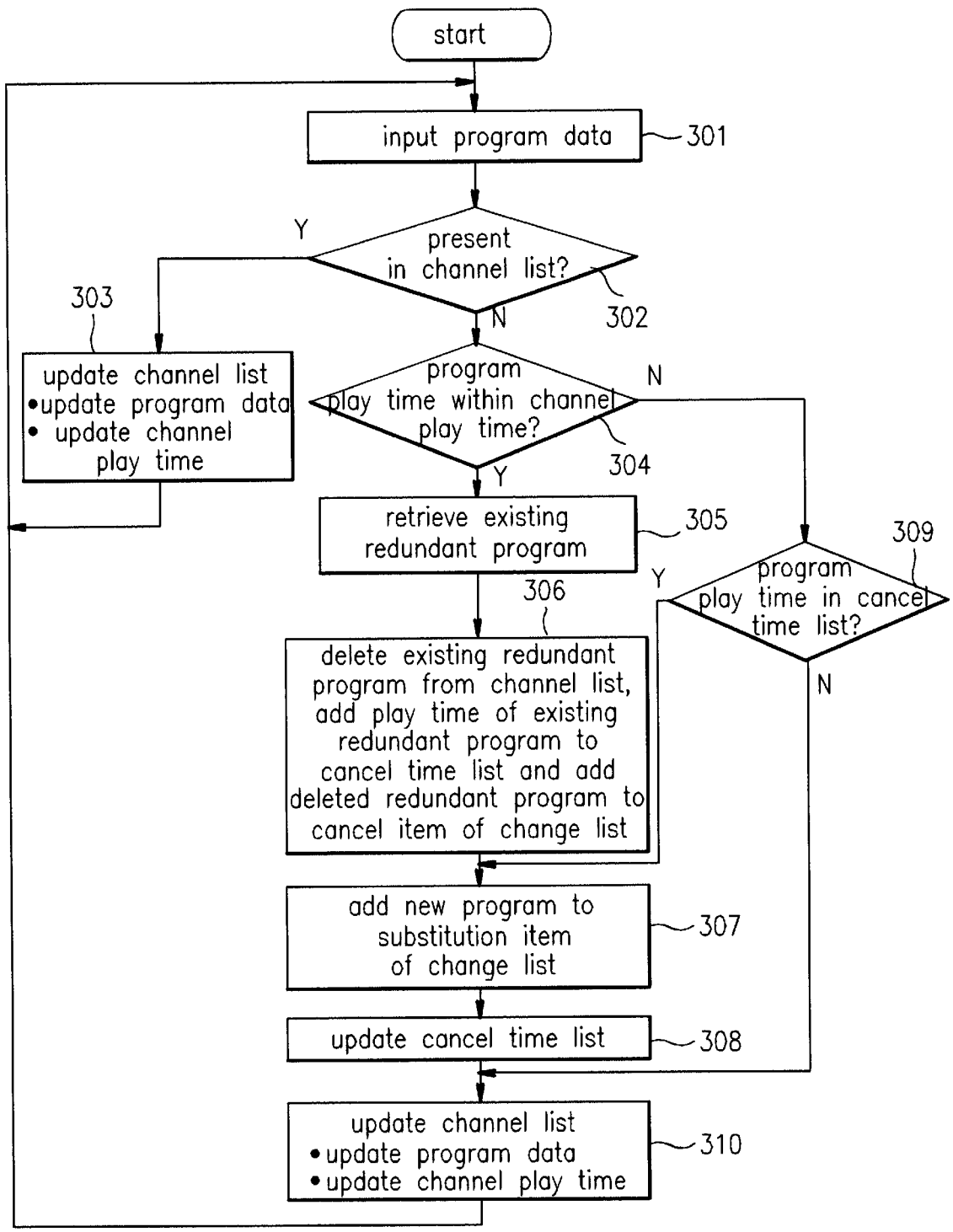
FIG. 3 is a flowchart illustrating a method for processing the additional information in the display device in accordance with the present invention.

FIG. 3 is a flowchart illustrating a method for processing the additional information in the display device in accordance with the present invention, which is effected by the CPU 20 in FIG. 2.

First, the CPU 20 reads the program guide information decoded by the decoder 22 and stored in the first memory 23 for its storage in the second memory 24 at step 301. Then, the CPU 20 determines at step 302 whether information on an input program included in the program guide information is present in the channel list. For example, the CPU 20 may determine whether a program ID of the input program is present in the channel list. Provided that the program ID is not transmitted from the associated broadcasting station, the CPU 20 may perform the determination operation on the basis of a program name, time, etc.

If the input program information is not present in the channel list, the CPU 20 determines at step 304 whether a play time of the input program (i.e., from program start time through program end time) is within the range of the above channel play time.

When the play time of the input program is within the range of the above channel play time, the CPU 20 recognizes that the broadcast for certain program has been changed and it is a substituted program. As a result of the recognition, the CPU 20 retrieves redundant program having a time redundancy with the play time of the input program from the channel list at step 305.

At step 306, the CPU 20 deletes the previous redundant program information retrieved at the above step 305 from the channel list and adds the deleted redundant program information (for example, a program name, program play time, etc.) to the cancel item in the change list. Further, the CPU 20 adds information about a play time of the previous redundant program to the cancel time list. Here, the cancel time list is provided for management of play times of changed redundant programs.

Then, the CPU 20 adds the information regarding the input program to be substituted for the previous redundant program (for example, a program name, program play time, etc.) to the substitute item in the change list at step 307. Here, the change list is provided for management of programs before and after change.

The CPU 20 updates the cancel time list at step 308. Namely, the cancel time list is updated by deleting the same time information as the play time of the input program from the cancel time list. For example, in the case where time information indicative of 12:30~3:30 is present in the cancel time list and the play time of the input program is 12:30~3:30, the time information indicative of 12:30~3:30 is deleted from the cancel time list. If time information indicative of 12:30~3:30 is present in the cancel time list and the play time of the input program is 12:301:30, only time information indicative of 12:30~1:30 is deleted from the cancel time list.

Further, the CPU 20 adds the substituted program in the channel list and updated the channel play time data of the above substituted program at step 310.

The change list is stored in the second memory 24. Data regarding the previous changed program is stored in the cancel item of the change list, and data regarding the program to be substituted for the previous changed program is stored in the substitute item of the change list. Also the cancel time list contains data about the play time of the previous changed program and it is stored in the second memory 24.

On the other hand, if at the above step 304 the play time of the input program, which is not present in the channel list, is not within the range of the above channel play time, the CPU 20 determines at step 309 whether information regarding the play time of the input program is present in the cancel time list.

The above step 309 is performed on the basis of the fact that, although the input program may be newly added irrespective of program change, it may be a second substitute program when one existing program is substituted with one or more programs.

Figure 6:
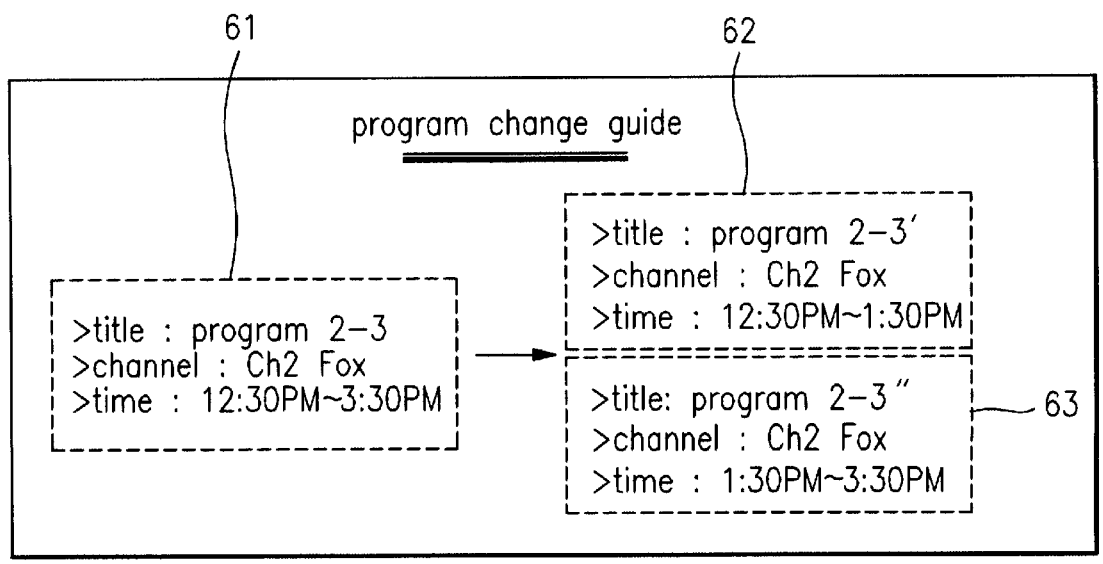
FIG. 6 is a view showing an example of program information before change and a plurality of program information after change, according to the present invention.

In other words, assuming one existing program is substituted with a plurality of programs as shown in FIG. 6, the CPU 20 deletes information on the existing redundant program from the channel list upon receiving a first substitute program. For this reason, upon receiving a second substitute program, the CPU 20 cannot detect redundant program at the above step 304. However, because information on a play time of the existing redundant program is stored in the cancel time list upon receiving the first substitute program, the CPU 20 can detect whether the input program is a newly added program or a substitute program, on the basis of detection about whether the information on the play time of the input program is present in the cancel time list.

In more detail, if the information on the play time of the input program is present in the cancel time list, the CPU 20 identifies the input program as a substitute program. For example, in the case where time information indicative of 1:30~3:30 is present in the cancel time list and the play time of the input program is 1:30~3:30, the input program is identifies a substitute program.

As a result, the CPU 20 adds the information regarding the input program to the substitute item in the change list at step 307 and updates the cancel time list at step 308. Namely, at step 308, the time information indicative of 1:30~3:30 is deleted from the cancel time list.

Then, at step 310, the CPU 20 adds the input program in the channel list and updates the channel play time data in the channel play time has been changed.

On the other hand, in the case where it is determined at the above step 309 that the information regarding the play time of the input program is not present in the cancel time list, the CPU 20 recognizes that the input program has been newly added irrespective of program change and thus adds the input in the channel list and updates channel play time data of the input program at step 310.

If the input program and existing program have different play times under the condition that they are the same in name, the CPU 20 recognizes that the input program is a new program to be substituted for the play time of the existing program and thus performs the above procedure. Further, the changed program may be received again as a substituted program of the different program with the same time. In this case, the CPU 20 performs the above procedure, too.

On the other hand, in the case where it is determined at the above step 302 that the input program information is present in the channel list, the CPU 20 recognizes that the program will be broadcasted as scheduled. However, a part of information regarding a scheduled program, such as a program name, may be changed. In this case, the CPU 20 updates the channel list for the partial data of the input program at step 303.

Figure 4:
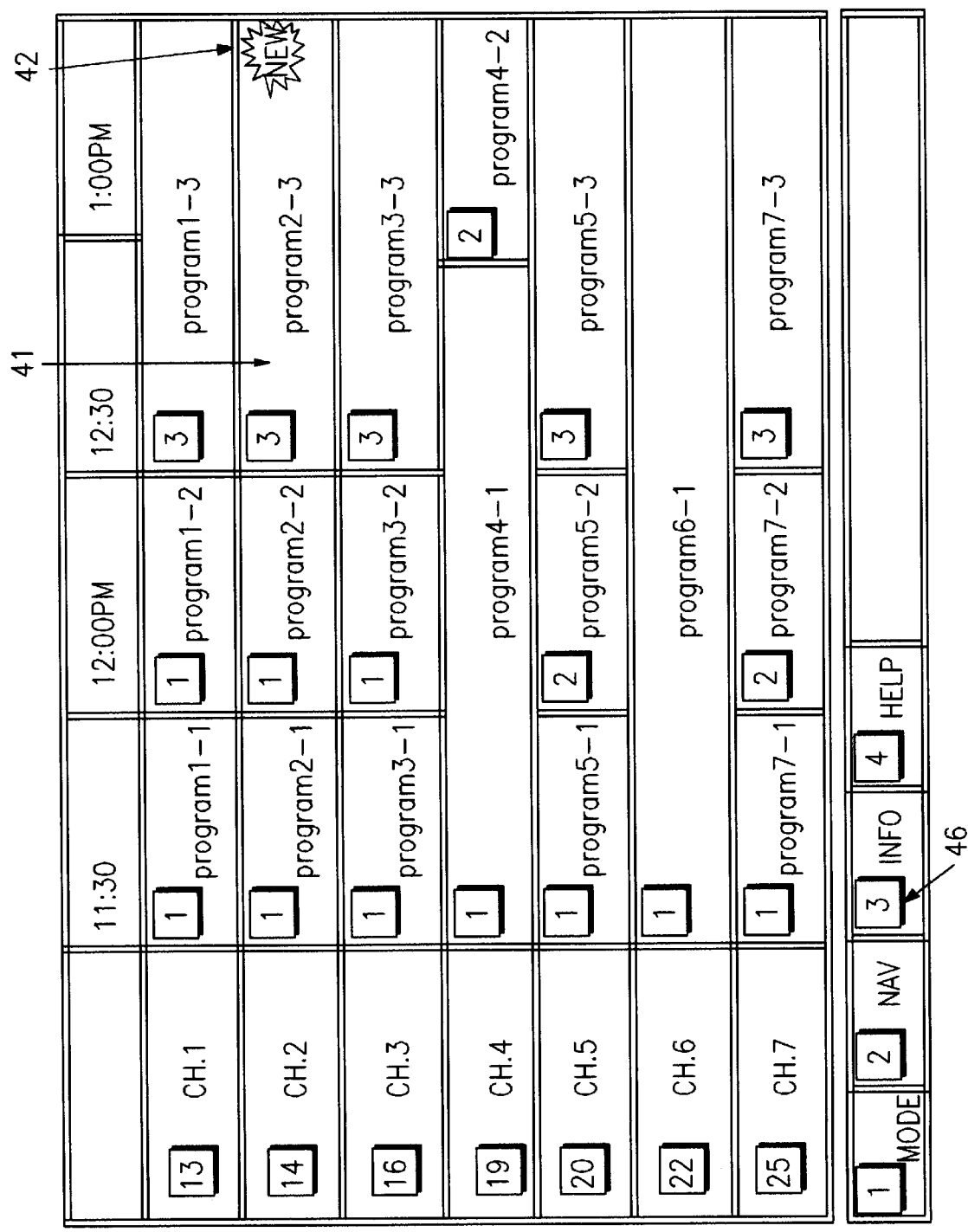
FIG. 4 is a view showing an example of an EPG presentation displayed on the screen in the full grid mode in accordance with the present invention.

FIG. 4 shows an example of an EPG information displayed on a screen in a full grid mode in accordance with the present invention. If the full grid mode EPG is made active by the viewer, an EPG information with newly changed program information is displayed on the screen on the basis of channel list information and change list information, created according to the method of FIG. 3 and stored in the second memory 24. Here, the newly changed program information is displayed in the form of a graphic symbol such as an icon so that it can be visually readily identified by the viewer. In other words, on the EPG information of the full grid mode consisting of time and channel axes, a scheduled program 2-3 is shown to be substituted with a new program 2-3' 41 because the scheduled program 2-3 has been changed for broadcasting station's reasons. In this case, a graphic symbol 42 such as an icon is displayed beside the program after change to indicate that it is a substitute program. Such a graphic symbol is stored in the second memory 24.

Figure 5:
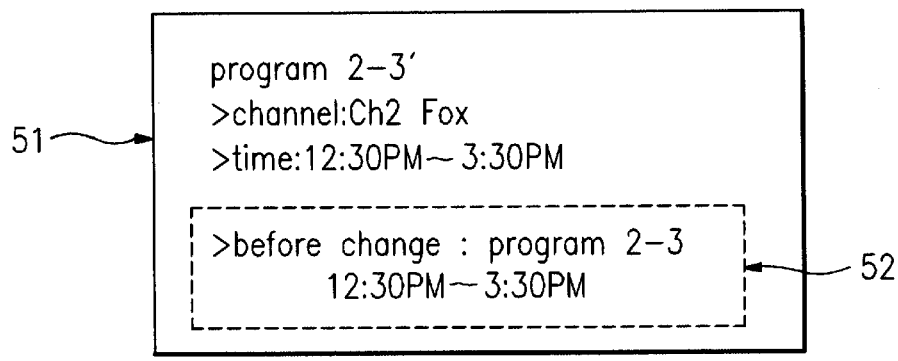
FIG. 5 is a view showing an example of program information before change and one program information after change, according to the present invention.

At this time, if the viewer selects a button for providing detailed program information, the CPU 20 displays information 52 on the program before change and information on the program after change on a screen 51, as shown in FIG. 5, on the basis of the cancel item and substitute item of the change list in the second memory 24. As a result, the viewer can recognize such contents of the program change.

In the case where one program is substituted with a plurality of programs, the CPU 20 displays information 61 on the program before change and information 62 and 63 on the programs after change on the screen, as shown in FIG. 6, to inform the viewer of such contents of the program change.

If the broadcast schedule for a certain program is changed as mentioned above while the viewer views a TV, the CPU 20, at once, displays an FPG information with the contents as shown in FIG. 5 or FIG. 6 on a portion of the TV screen to notify the viewer of such a program change situation.

Namely, the viewer can be accurately guided to the changed contents based on the change list information in the second memory 24. As a result, the viewer can be prevented from becoming confused even when a program before change has been reserved for recording or registered as a favorite program.

As apparent from the above description, according to the present invention, when the schedule for a certain program (i.e., a start time or contents of the program) has been changed, such a situation is automatically detected and notified to the viewer. Therefore, the viewer can be prevented from becoming confused and also reserving an undesired program. In particular, information on a program after change is displayed in the form of a graphic symbol such as an icon, so that the viewer can visually readily recognize the program change situation without viewing detailed information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a display device which has a memory for storing various additional information received from a broadcasting station, a method for processing said additional information, comprising the steps of:
   a) comparing information newly received from said broadcasting station with previously received additional information to determine whether they are different from each other;
   b) detecting whether the newly received additional information is a substitute for the previously received additional information, if said newly and previously received additional information are different from each other;
   c) updating previous redundant additional information stored in said memory to said newly received additional information if said newly received additional information is the substitute for said previously received additional information; and
   d) providing a visual indication of said additional information updated at said step c) to a viewer;
   wherein said step b) includes the steps of:
   b-1) detecting whether said newly received additional information is present in an additional information list stored in said memory and then determining whether a play time of an input program among said newly received additional information is within the range of a channel play time, if said newly received additional information is not present in said additional information list; and
   b-2) retrieving information on a previous redundant program having a time redundancy with said play time of said input program from said additional information list if said play time of said input program is within the range of said channel play time.

2. The method as set forth in claim 1, wherein said additional information is program guide information.

3. The method as set forth in claim 1, wherein said step a) includes the step of comparing a program identifier in said newly received additional information with that in said previously received additional information.

4. The method as set forth in claim 1, wherein said step a) includes the step of comparing program time information in said newly received additional information with that in said previously received additional information.

5. The method as set forth in claim 1, wherein said step a) includes the step of comparing said newly received additional information with said previously received additional information on the basis of an additional information list stored in said memory.

6. The method as set forth in claim 1, wherein said play time of said input program is a period from a start time of said input program to an end time thereof, and said channel play time is a period from a start time of the earliest program to an end time of the latest program, among programs of a corresponding channel stored in said memory.

7. The method as set forth in claim 1, wherein said step c) includes the steps of:
   c-1) deleting said previous redundant program information from said additional information list;
   c-2) adding the deleted previous redundant program information to a cancel item of a change list stored in said memory;
   c-3) adding information on a play time of said previous redundant program to a cancel time list stored in said memory;
   c-4) adding information on said input program to a substitute item of said change list;
   c-5) deleting information on said play time of said input program from said cancel time list; and
   c-6) adding said input program information to said additional information list.

8. The method as set forth in claim 1, wherein said step b) further includes the step of b-3) detecting whether said information on said play time of said input program is present in said cancel time list, if said play time of said input program is not within the range of said channel play time.

9. The method as set forth in claim 7, wherein said step c) further includes the steps of:
- c-7) adding said input program information to said substitute item of said change list if said information on said play time of said input program is present in said cancel time list;
- c-8) deleting said information on said play time of said input program from said cancel time list; and
- c-9) adding said input program information to said additional information list.

10. The method as set forth in claim 9, wherein said step c) further includes the step of c-7) adding said input program information to said additional information list if said information on said play time of said input program is not present in said cancel time list and then updating information on said channel play time.

11. The method as set forth in claim 1, wherein said step d) includes the step of displaying said additional information updated at said step c) in an additional information display mode on the basis of an additional information list and change list stored in said memory.

12. The method as set forth in claim 11, wherein said step d) further includes the step of displaying a graphic symbol to indicate said additional information updated at said step c) in said additional information display mode.

13. The method as set forth in claim 12, wherein said graphic symbol has an icon shape.

14. The method as set forth in claim 11, wherein said step d) further includes the seep of displaying both additional information before change and additional information after change on the basis of a cancel item and substitute item of a change list stored in said memory if detailed information of said additional information updated at said step c) is selected in said additional information display mode.

15. The method as set forth in claim 11, wherein said step d) further includes the step of displaying both additional information before change and additional information after change on a portion of a screen on the basis of a cancel item and substitute item of a change list stored in said memory if a scheduled program is changed while the viewer views a television.

16. In a display device which has a memory for storing various additional information received from a broadcasting station, a method for processing said additional information, comprising the steps of:
- a) comparing information newly received from said broadcasting station with previously received additional information to determine whether they are different from each other;
- b) detecting whether the newly received additional information is a substitute for the previously received additional information, if said newly and previously received additional information are different from each other;
- c) updating previous redundant additional information stored in said memory to said newly received additional information if said newly received additional information is the substitute for said previously received additional information; and
- d) providing a visual indication of said additional information updated at said step c) to a viewer;
- wherein said step d) includes the step of displaying said additional information updated at said step c) in an additional information display mode on the basis of an additional information list and change list stored in said memory;
- wherein said step d) further includes the step of displaying both additional information before change and additional information after change on the basis of a cancel item and substitute item of a change list stored in said memory if detailed information of said additional information updated at said step c) is selected in said additional information display mode.

17. The method as set forth in claim 16, wherein said step d) further includes the step of displaying a graphic symbol to indicate said additional information updated at said step c) in said additional information display mode.

18. The method as set forth in claim 17, wherein said graphic symbol has an icon shape.

19. In a display device which has a memory for storing various additional information received from a broadcasting station, a method for processing said additional information, comprising the steps of:
- a) comparing information newly received from said broadcasting station with previously received additional information to determine whether they are different from each other;
- b) detecting whether the newly received additional information is a substitute for the previously received additional information, if said newly and previously received additional information are different from each other;
- c) updating previous redundant additional information stored in said memory to said newly received additional information if said newly received additional information is the substitute for said previously received additional information; and
- d) providing a visual indication of said additional information updated at said step c) to a viewer;
- wherein said step d) includes the step of displaying said additional information updated at said step c) in an additional information display mode on the basis of an additional information list and change list stored in said memory; and
- wherein said step d) further includes the step of displaying both additional information before change and additional information after change on a portion of a screen on the basis of a cancel item and substitute item of a change list stored in said memory if a scheduled program is changed while the viewer views a television.

20. The method as set forth in claim 19, wherein said step d) further includes the step of displaying a graphic symbol to indicate said additional information updated at said step c) in said additional information display mode.

21. The method as set forth in claim 20, wherein said graphic symbol has an icon shape.

* * * * *